US005232527A

United States Patent [19]

Vernhet et al.

[11] Patent Number: 5,232,527

[45] Date of Patent: Aug. 3, 1993

[54] PROCESS FOR PRODUCTION OF A TRANSFERRABLE PROTECTIVE FILM PRODUCT AND PRODUCT OBTAINED FOR PROTECTING DOCUMENTS OR OTHER ELEMENTS

[76] Inventors: Louis Vernhet, 3 rue rose Hugla; Francois Trantoul, Le Monna, both of 12100 Millau, France

[21] Appl. No.: 123,677

[22] Filed: Nov. 23, 1987

[30] Foreign Application Priority Data

Nov. 27, 1986 [FR] France ................................ 86 16707

[51] Int. Cl.$^5$ ................................................ B32B 31/00

[52] U.S. Cl. ...................................... 156/67; 156/239; 156/246; 156/249; 156/277; 283/94; 283/109; 428/195; 428/203; 428/204; 428/916

[58] Field of Search ............... 428/142, 203, 204, 918, 428/916, 195; 427/8, 161, 208.8, 267; 156/277, 289, 249, 247, 230, 246, 67, 239; 528/66, 76, 77, 85; 283/94, 109

[56] References Cited

U.S. PATENT DOCUMENTS 3,907,974 9/1975 Smith ................................ 156/249
4,219,596 8/1980 Takemoto et al. ............... 427/208.8
4,389,472 6/1983 Neuhaus et al. .................... 428/203
4,409,383 10/1983 Zalucha et al. ....................... 528/76
4,421,816 12/1983 Arnold ................................ 156/234
4,565,730 1/1986 Poth et al. .......................... 428/204
4,640,727 2/1987 Janssen ............................... 428/195
4,822,827 4/1989 Bonk et al. ........................... 528/85

*Primary Examiner*—John J. Gallagher
*Attorney, Agent, or Firm*—Harold H. Dutton, Jr.

[57] ABSTRACT

A process for producing protection product of a transferrable protective film for covering and protecting the surface of a document or another element, comprising providing a non-stick support sheet (1), at least one printing (2) of a polymerizable liquid mixture of a hydroxylated polyol and an isocyanate or polyisocyanate, for obtaining a thin transparent polyurethane film, covering said film with a transparent adhesive layer (3) and protecting said adhesive layer with a silicone protective sheet (4); the polyurethane film may be transferred without heat to the document to be protected in order to avoid falsification thereof and for protecting the document from external damaging elements.

11 Claims, 3 Drawing Sheets

PROCESS FOR PRODUCTION OF A TRANSFERRABLE PROTECTIVE FILM PRODUCT AND PRODUCT OBTAINED FOR PROTECTING DOCUMENTS OR OTHER ELEMENTS

This invention relates to a process for producing a transferrable protective film product, useful for covering and protecting the surface of a document or another such element. The invention also relates to the protective product obtained.

BACKGROUND AND OBJECTS OF THE INVENTION

Often it is desirable to protect documents, especially paper documents, either for placing them under a protective cover from external harmful factors such as humidity (maps, exterior use plans, etc.), or for avoiding the possibility that they could be falsified and making them void (identification papers, administration documents etc.).

At the present time, such protection may be obtained through plastification by heating (such as for example is described in French patent 1,549,724); but, such a process requires professional equipment and is carried out by specialists. These conditions for carrying out the protection process and the cost of the process limit the process to its application to specific, narrow fields (important or valuable documents, small surfaces to be covered, etc.) and exclude the general use for every day documents. Moreover, the plastification produces a covering of the document with a relatively thick layer (based on polyvinyl) and modifies the characteristics of the document which lose a significant part of its flexibility and is no longer pliable or capable of being manipulated as before the covering.

Additionally, it is known in the field of decals to use cellulosic or nitro-cellulosic transfer films (see for example French patent 2,427,208) or films obtained by the deposition of an alkyd-urethane (see for example U.S. Pat. No. 4,308,310), which are used for covering a surface of a design. But these marking films are not useful for meeting the objectives of protection intended by the present invention, as they are very fragile and not resistant to even weak solvents and, certainly, not to stronger solvents such as the cellulosic diluents. A particular problem is that these films may be easily removed without altering the support, and therefore do not create a protection against falsification.

The present invention provides a new protective product useful "cold" or at ambient temperature with simple pressure, in the manner of a transfer film, by anyone without any particular equipment. By "cold" is meant that heating is not required to carry out the process.

The primary object of the invention is to provide a product which gives a very secure protection as much with regard to external damaging factors as with regard to falsifications. In particular, the invention provides a product having a transferrable protective film which is resistant to weak solvents as well as to cellulosic solvents, and the removal or attempted removal of which is necessarily accompanied by either a destruction or a very apparent alteration of the document, for most of the materials used, and especially for paper documents.

Another object of the invention is to permit personalizing the document, by adding to it designs or a weave either directly visible or invisible with ordinary light but detectable under ultraviolet radiation.

Another object is to avoid modifying, significantly, the physical characteristics of the protected document, while retaining in the document a flexibility and the possibility of folding, analogous to such properties as are initially possessed by the document.

Still another object of the invention is to provide a process for producing a protective product which benefits from relatively low cost, this cost, combined with the ease of using the product permitting the general utilization of the product with most common documents.

Still a further object of the invention is to provide a process which lends itself to obtaining transferrable protective films intended for diverse functions in accordance with the final use of the product intended.

DESCRIPTION OF THE INVENTION

To this end, the process according to the present invention for obtaining a protective product of a transferrable protective film for cold application by pressure utilizes as a substrate a layer obtained by printing a bi-component polymerizable liquid mixture containing a hydroxylated polyol and an isocyanate or polyisocyanate, the mixture being capable of polymerizing in-situ for producing a thin transparent polyurethane layer. In the simplest form of carrying out the process, the process comprises producing on a non-adherent support sheet a single printing of a polymerizable liquid mixture such as that mentioned above, in such a manner as to obtain after polymerization in-situ a thin transparent film of polyurethane on the sheet-support, and then covering the film with a transparent adhesive layer.

In another form of carrying out the invention and particularly adapted for producing a protective product allowing the personalization of a document or other element, the process according to the invention comprises:

producing on a non-stick support sheet a first printing containing at least one polyermizable liquid mixture such as defined above, in such a manner as to cause in-situ polymerization of the mixture producing a first transparent polyurethane layer, before complete polymerization of the first layer, producing at least one intermediate layer with a design or a weft by means of a polymerizable liquid mixture such as defined above, with the addition of a coloring substance from among the following group: a substance fluorescent under radiation such as ultraviolet and invisible in normal light, a substance fluorescing under ultraviolet radiation and visible under normal light, or an opaque pigment, in such a manner as to enhance in-situ polymerization of the mixture leading to the formation of a discontinuous intermediate polyurethane layer, before complete polymerization of the intermediate layer, producing a second continuous coating by means of a polymerizable liquid mixture such as defined above, in such a manner as to enhance the in-situ polymerization of the mixture producing a second transparent polyurethane layer, finally covering the second coating with a transparent adhesive layer.

Thus, the process of the invention leads to a covering by printing of the support sheet with a thin film of polyurethane, a monolayer in the first case and multilayer in the second. Each printing may be carried out by any known printing process, and in particular by serigraphy (screen printing) or by heliogravure. The liquid mixture used for printing is preferably prepared in a ratio of 1.8 to 2.2 units of hydroxylated polyol per unit of isocyanate or polyisocyanate. By way of example, it is possible to use a mixture of hydroxylated polyacrylic resins, or hydroxylated polyester resin or hydroxylated polyether resin, and an aliphatic or aromatic polyisocyanate.

This technique permits obtaining tightly adherent films of polyurethane which are extremely thin and resistant, the thickness of which may be adjusted as a practical matter between 5 and 50 microns. In the case of a multilayer film obtained by several printings, the various layers adhere intimately one to another by reason of their simultaneous polymerization which leads to an interpenetration of the molecules of the polymer at the interfaces: the film obtained is in reality not a complex, but a true composite in which the layers are not separable. The intermediate layer is thus strictly inaccessible.

The adhesive layer covering this film may itself be obtained, before complete polymerization of the last layer of the film, by printing of the transparent adhesive material thereon, notably by serigraphy or heliogravure. The adhesive material used is, for example, of a known acrylic type.

In order to permit an ultimate use of the product by the consumer, a protective silicone treated sheet (or treated in an analogous manner) is then arranged on the adhesive layer for protecting the adhesive until the time of use.

Thus, there is obtained a protective product which is presented in the form of a sheet, which may be distributed and arranged by the final user, and which may be put in place very simply, and does not require any particular apparatus. For protecting a document or any analogous surface, it is sufficient to remove the silicone sheet, to apply the product cold to the surface to be protected in such a manner that the adhesive layer covers the surface, and exerting a pressure on the support sheet in order to bring about the transfer, and thereafter removing the support sheet. Such a process is carried out essentially cold or at ambient temperature without particular precautions and may be accomplished by anyone without particular skill.

Tests have shown that an extremely effective protection is obtained for documents. The polyurethane film, itself very thin, protects the documents from exterior influences, and is insensitive to a majority of solvents. The few solvents which would attack the film, such as acetone, also destroy the paper, as well as other materials of this type, in such a manner that any attempted alteration of the film for accessing the surface of a document thus protected leads to a very apparent damaging of the document.

Additionally, in the case of multilayer film, the intermediate layer situated in an inaccessible position between the two other layers permits personalizing in a non-falsifiable manner the documents to be protected. The colored substance provided in the polymerizable mixture of this intermediate layer depends upon the particular applications. An invisible substance reacting with ultraviolet light (or possible infrared light), a visible substance producing a modification of the color under ultraviolet radiation, an opaque substance forming a drawing or opaque weave on the document, or parts thereof.

The protective film according to the invention may be easily adapted for covering or protecting one or several surfaces in a predetermined shape. It is sufficient that one or more printings by means of one or more liquid polymerizable mixtures, then printing of the adhesive material, will be obtained on one or several portions of the support sheet in corresponding forms to those of the surfaces to be protected. It should be noted that the process of the invention permits obtaining protection products themselves for covering large surfaces, and that, at a reduced cost with respect to the extremely thin nature of the film of polyurethane and thus the quantity of material utilized.

Additionally, it is possible in some cases to adjust the adhesive power of the adhesive layer by a printing thereof in a plurality of separate zones according to the process described in French patent application No. 86.05039 in the name of the same inventors. One thus obtains an adhesive weave of which the adhering power is easily adjustable by controlling the density and/or the extent of the printed adhesive zone.

BRIEF DESCRIPTION OF THE DRAWINGS

The examples for carrying out the invention are described in the description which follows with reference to the attached drawings, in which.

DESCRIPTION OF PREFERRED EMBODIMENTS

The process illustrated by way of example is carried out on serigraphy printing machines, in particular on conventional such machines (articulated screen) or on machines with an integral raising screen (screen moveable in translation). In the case hereafter described where the printings have a thickness on the order of 5 to 10 microns, the two types of machines may be used interchangeably. In the case where more significant thicknesses would be desirable (between 10 and 50 microns), it would be preferable to use the latter type of machine which permits obtaining thicker impressions in a single pass. Of course it will be understood that the first type may also be used for several passes.

Figure 1A:
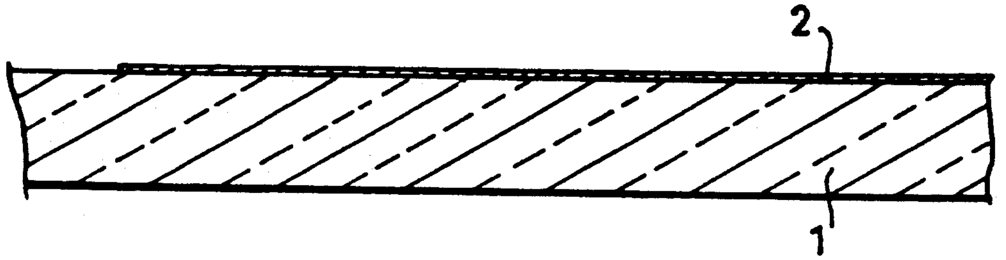
FIGS. 1*a*, 1*b*, and 1*c* are schematic views on a greatly enlarged scale of the steps of the process for producing the protective product in accordance with the invention, with a single layer film.
Figure 1B:
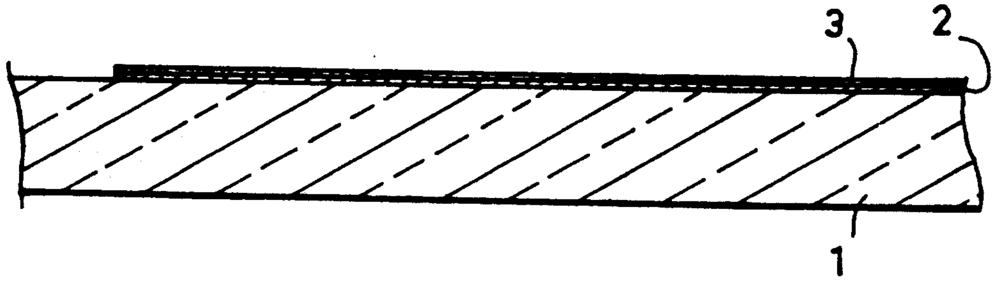
Figure 1C:
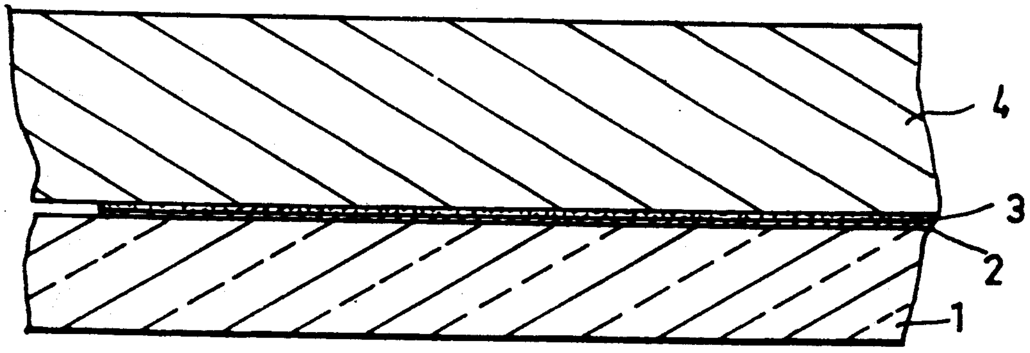

The monolayer film product shown in FIGS. 1*a*–1*c* comprises a transparent support sheet 1 (FIG. 1*a*) of a type termed non-stick, capable of only developing weak forces of connection with the majority of polymers. For example, this support sheet may be a sheet of polystyrene of a density on the order of 120 g/m$^2$.

This support sheet 1 is selected of a size exceeding that of the surface to be protected.

It is placed on the plate of the serigraph machine, and the screen thereof is coated with a previously prepared liquid mixture of a hydroxylated polyol, and a isocyanate.

This mixture may particularly be prepared by the addition of two parts of hydroxylated polyacrylic resin or hydroxylated polyester resin, or hydroxylated polyether resin of low molecular weight, and one part of trifunctional aliphatic or aromatic polyisocyanate (for example polyacrylic resin "Ref. U 8560" and trimerized hexomethylene di-isocyanate "Ref. U 8580", sold by "Laboratoire Chimitec").

The quantity of the mixture spread upon the serigraph screen is adjusted so as to correspond to a thickness of 8 to 10 microns.

After the printing on the support sheet 1, the mixture polymerizes and produces a thin transparent film of polyurethane 2. The printing is carried out according to a form corresponding to that of the surface to be protected, for example rectangular in the case illustrated schematically in FIGS. *2a, 2b, 2c,* intended for the protection of identification cards.

During the production of a series, the serigraph is cleaned each hour in order to avoid clogging of the screen.

The support sheet 1 and its polyurethane printing 2 are then allowed to remain in the ambient air in order to permit the polymerization to commence. The overall duration of the polymerization is several days (on the order of 8 to 10 days).

Before obtaining a complete polymerization, the assembly is again placed on the serigraph machine for carrying out a new printing on top of the film 2 of a transparent adhesive material. Depending upon the temperature conditions, the film is allowed to polymerize between 3 and 36 hours, and preferably for about 4 to 5 hours. This delay permits assuring that the film is sufficiently dry and consistent, for being subjected to a further printing but with still an incomplete polymerization, in order to permit a better adhesion of the new printing. This will be for example carried out by using an acrylic adhesive material of the type sold by "Tiflex" under the name "Acrylic Adhesive". This printing is carried out on the overall surface of the film 2 in order to cover the same with a transparent adhesive layer 3 (FIG. 1*b*) the thickness of which is similar to that of the film (comprising between 5 and 50 microns) and, in this example on the order of 8 to 10 microns.

The assembly is then covered by a thin silicone protective sheet 4, (FIG. 1*c*) the density of which may be on the order of 145 gr/m$^2$.

The protective product thus obtained may be stored and distributed without particular precaution.

In FIGS. *2a, 2b,* and *2c,* there is illustrated schematically an application of the invention for the protection of identification cards. This protection may be carried out by the organization or agency charged with establishing these cards, after authentication by the named person and his signature, and in some cases being digitally printed, this being done at the same time that the identification card is given to him.

Figure 2A:
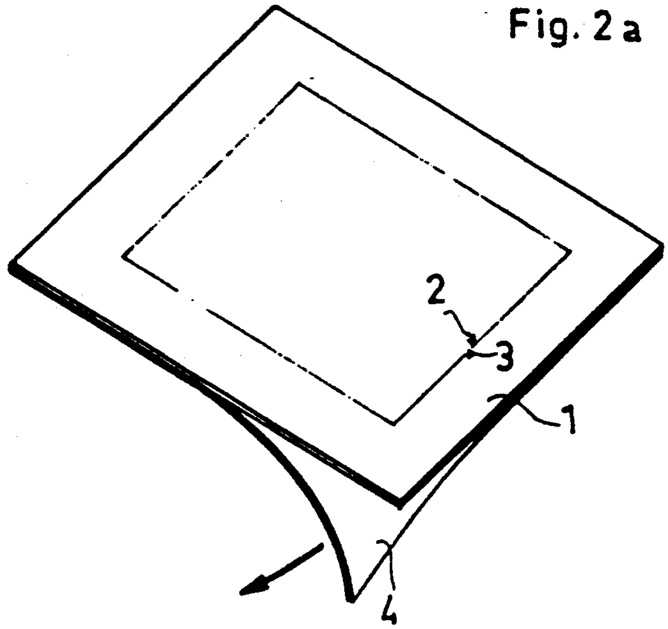
FIGS. 2*a*, 2*b*, and 2*c* illustrate schematically the use of this product.
Figure 2B:
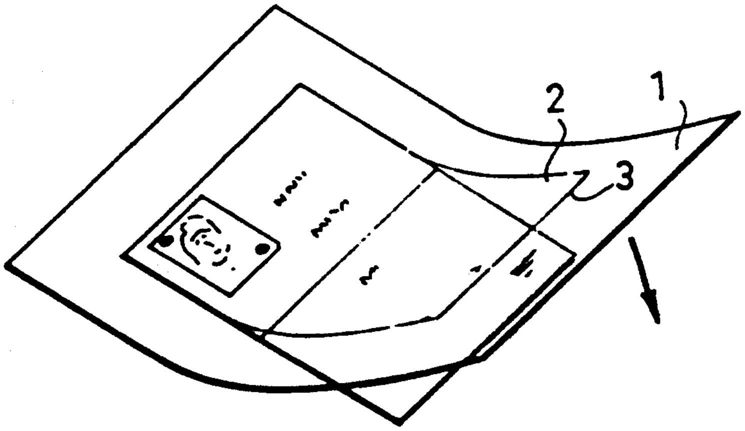

The protection product is shown schematically in FIG. *2a,* with the silicone protective sheet 4 in the process of being removed. After removal of this protective sheet, the product is applied to the identification card (FIG. 2*b*), the printings 2 and 3 of polyurethane and adhesive material having the form of a rectangle of a size corresponding to that of the card. These printings are placed in a corresponding fashion over the surface of the card and the operator exerts a pressure which brings the adhesive layer 3 to adhere to the card with the simultaneous transfer of the film 2.

Figure 2C:
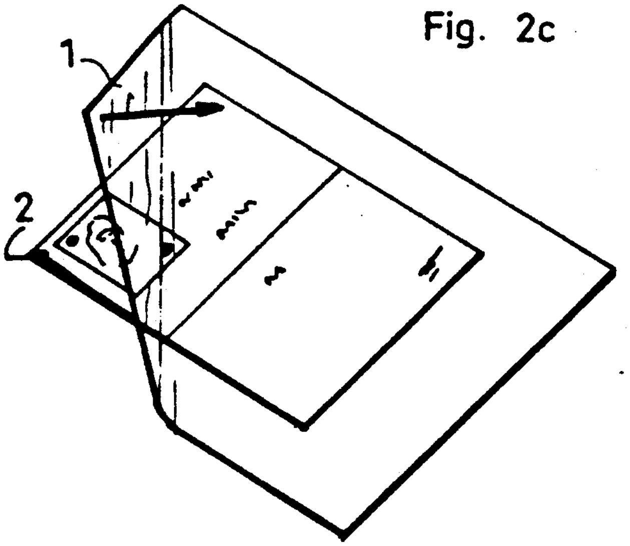

Then, the support sheet 1 is simply removed (FIG. 2*c*) and the identification card is then protected. Tests have shown that the thin film 2, once it has been adhered to the document by the adhesive layer 3, is impossible to be separated therefrom. By virtue of its excellent mechanical resistance, it cannot be locally scratched without damaging the document. Moreover, test with solvents or diluents have not found one capable of attaching the film without damaging the paper document. One thus obtains a document which is extremely difficult to falsify.

It should be noted that the protective film is only slightly noticeable and does not significantly modify the flexibility of the card.

FIGS. 3*a*–3*e* illustrate on a greatly enlarged scale the production of a protective product of a multilayer polyurethane film.

The first step (FIG. 3*a*) is similar to the first step of the process heretofore described and comprises printing on a polystyrene support sheet, a transparent polyurethane layer 6 of a polymerizable mixture the same as that heretofore described.

Figure 3A:
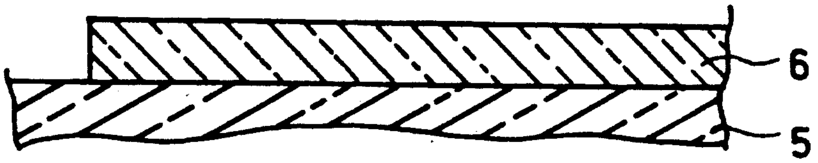
FIGS. 3*a*, 3*b*, 3*c*, 3*d*, and 3*e* are schematic views illustrating on greatly enlarged scale the steps of the process for the production of a protective product of a multi-layer film.
Figure 3B:
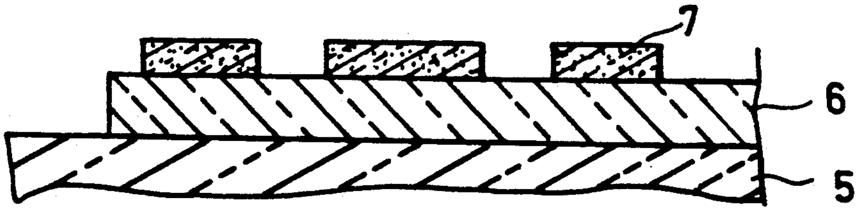

Before the completion of the polymerization of this mixture, that is after a period of about 3-36 hours after printing, a discontinuous intermediate printing 7 of drawings, designs, or weaves is carried out on the first impression (FIG. 3*b*). A delay on the order of 4–5 hours gives good results (the initial impression being sufficiently consistent to permit the intermediate printing, while enabling wide adhesion of the layers by reason of the phenomena of simultaneous polymerization at their interface).

This intermediate impression 7 is carried out with a similarly based resin to which has been added a coloring substance at between 2 and 50% by weight, the polyisocyanate being thereafter mixed. For example, depending upon the effects desired, one may add one of the following substances having the form a fine powder:

a substance based on rare earths and rare metals sold by "Chimitec" under the names "Lumiton Fluo U.V. Codes" (between 2 and 25% by weight), in order to provide designs invisible under solar light but becoming fluorescent under ultraviolet radiation;

a substances based on fluorescent organic colorants having a long series of double bonds in a cyclic or benzenic form, sold by "Chimitec" under the name "Lumiton Fluo LJ" (between 25% and 50% by weight), in order to provide designs which are fluorescent under solar light, having an intense fluorescence under ultraviolet radiation with a change in color, opaque pigments of titanium oxide or carbon black (5% to 25% by weight), transparent organic pigments of ophthalocyanine (blue) or yellow "Hensa" (between 5% and 25% by weight).

Figure 3C:
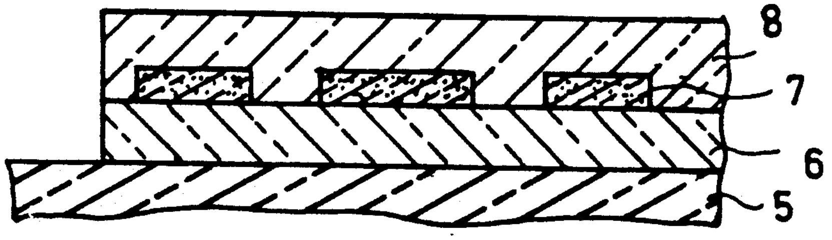

Before complete polymerization of this intermediate printing, a second printing 8 is carried out identically to the printing 6 for obtaining a new transparent layer of polyurethane (FIG. 3*c*). This printing is obtained in the same time period as previously (between 3 and 36 hours, and preferably 4–5 hours after the intermediate printing).

During the polymerization of the three layers 6, 7 and 8, there is obtained a composite film of polyurethane with a design or integral weave, the layers no longer being separable. The multilayer film may particularly have a thickness on the order of 8–20 microns.

Figure 3D:
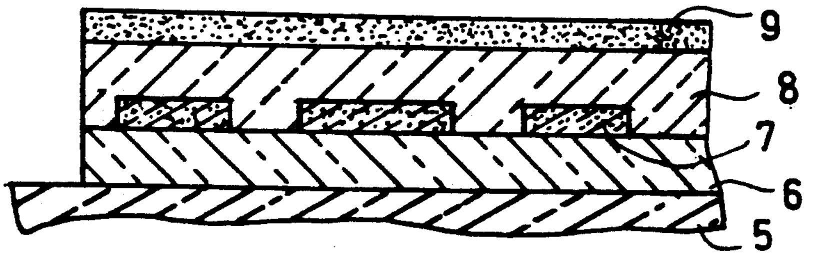
Figure 3E:
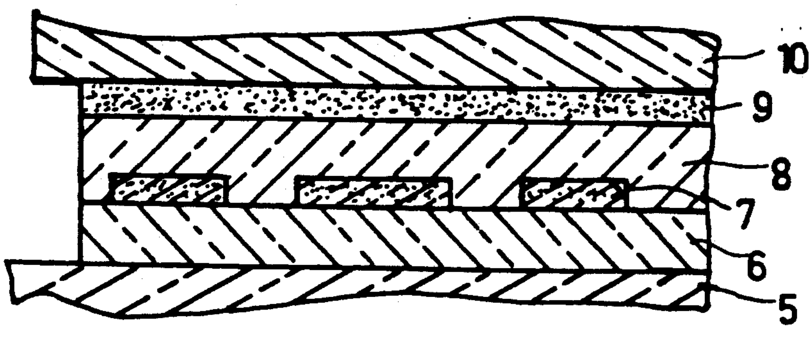

A printing of transparent adhesive material 9 is then carried out as previously discussed (FIG. 3*d*). This printing is preferably completed before complete polymerization of the layer 8 after a period of between 3 and 36 hours and preferably on the order of 4–5 hours.

The assembly is then covered by a silicon protective sheet 10 analogous to that of the product previously described.

The protection product thus obtained may be stored and distributed without particular precaution. Its utilization is similar to that heretofore described for the monolayer polyurethane film product. It should be noted that, in the appropriate case, several intermediate printings may be superimposed in successive passes on the machine (with a delay between passes of between 3 and 36 hours and preferably on the order of 4–5 hours).

While this invention has been described as having certain preferred features and embodiments, it will be understood that it is capable of still further modification and variation without departing from the spirit of the invention, and this application is intended to cover any and all variations, modifications, and adaptations of the invention as fall within the spirit of the invention and the scope of accompanying claims.

We claim:

1. A process for producing a protection product of a protective film transferrable without heat by pressure, for covering and protecting the surface of a document or other element, the process comprising providing on a non-stick support sheet a first continuous printing of a polymerizable bi-component liquid mixture containing a hydroxylated polyol and a isocyanate or polyisocyanate in such a manner as to cause polymerization in-situ of the mixture ambient air without heater for forming a first transparent polyurethane layer, before completion of polymerization of said first layer, producing at least one intermediate printing of a design or a weave by means of a polymerizable bi-component liquid mixture containing a hydroxylated polyol and an isocyanate or a polyisocyanate, with the addition of a coloring substance selected from the group consisting of: a substance fluorescing under ultraviolet radiation and invisible under natural light, a substance fluorescing under ultraviolet radiation and visible under ordinary light, and an opaque pigment, in such a manner as to enhance the polymerization in-situ of said mixture for forming a discontinuous intermediate layer of polyurethane, before completion of polymerization of said intermediate printing, producing a second continuous printing of a polymerizable bi-component liquid mixture of a hydroxylated polyol and an isocyanate or polyisocyanate, so as to enhance polymerization in-situ of said mixture for forming a second transparent polyurethane, and covering said second layer with a transparent adhesive layer.

2. A process as in claim 1 and including applying said intermediate layer between 3 and 36 hours after said first printing, and said second layer is printed between 3 and 36 hours after said intermediate printing layer.

3. A process as in one of claim 1 and wherein said polymerizable liquid mixture used for each printing comprises a mixture of hydroxylated polyacrylic resin or hydroxylated polyester resin or hydroxylated polyether resin and an aliphatic or aromatic polyisocyanate.

4. A process as in claim 5 and wherein said polymerizable liquid mixture used for each printing comprises a mixture of between 1.8 and 2.2 units of resin per unit of isocyanate or polyisocyanate.

5. A process as in claim 4 and wherein said polymerizable liquid mixture used for each intermediate printing contains between 2 and 50% of said coloring substance with respect to said resin by weight.

6. A process as in claim 1 and including printing said polymerizable liquid mixture by serigraphy or heliogravure.

7. A process as in claim 3 and wherein said film has a thickness of between 5 and 50 microns.

8. A process as in claim 7 and including applying said transparent adhesive layer between 3 and 36 hours after the last printing, using a printing of a film by serigraphy or heliogravure of a transparent adhesive material.

9. A process as in claim 8 wherein said adhesive material comprises and acrylic adhesive.

10. A process as in claim 9 and wherein the printing of said adhesive material is carried out in a plurality of separate zones for producing a discontinuous adhesive layer for adjusting the adhering power thereof.

11. A process as in claim 2 and including providing a silicone protective sheet (4) on the surface said adhesive layer (3).

* * * * *